(12) United States Patent
Howard

(10) Patent No.: US 7,205,992 B2
(45) Date of Patent: Apr. 17, 2007

(54) METHOD OF MAPPING INTO TRIANGLES AN AREA OF WIRELESS LAN AND PORTABLE DEVICE THEREOF

(75) Inventor: Justin Howard, Duxford (GB)

(73) Assignee: Nokia Corporation, Espoo (FI)

( * ) Notice: Subject to any disclaimer, the term of this patent is extended or adjusted under 35 U.S.C. 154(b) by 432 days.

(21) Appl. No.: 10/257,067

(22) PCT Filed: Apr. 11, 2001

(86) PCT No.: PCT/EP01/04157

§ 371 (c)(1),
(2), (4) Date: Feb. 20, 2003

(87) PCT Pub. No.: WO01/80496

PCT Pub. Date: Oct. 25, 2001

(65) Prior Publication Data

US 2003/0157940 A1    Aug. 21, 2003

(30) Foreign Application Priority Data

Apr. 13, 2000    (GB) ............................ 0009088.6

(51) Int. Cl.
  *G06T 17/20*    (2006.01)
  *H04B 17/00*    (2006.01)

(52) U.S. Cl. .................... 345/423; 345/440; 455/67.7
(58) Field of Classification Search ............... 345/423, 345/440, 419, 420, 426; 455/67.11, 67.15, 455/67.14, 67.16, 67.7, 446–449; 702/186
See application file for complete search history.

(56) References Cited

U.S. PATENT DOCUMENTS 5,214,687 A    5/1993    Kansakoski et al.

(Continued)

FOREIGN PATENT DOCUMENTS

EP    0 439 714 B1    5/1995

(Continued)

OTHER PUBLICATIONS

Tan et al., "Modelling and path loss measurements for microcellular communications in a corridor complex", Electronics Letters, vol. 30, Issue 24, Nov. 24, 1994, pp.:2008-2010.*

(Continued)

*Primary Examiner*—Ulka Chauhan
*Assistant Examiner*—Daniel Hajnik
(74) *Attorney, Agent, or Firm*—Squire, Sanders & Dempsey, LLP.

(57) ABSTRACT

The invention provides a method of mapping into tessellating triangles an area from a set of sample point spaced over the area. First, each point is connected to every other point to create a group of lines. Then the number of intersections of each line is counted. The line or lines with the greatest number of intersections is removed from the group. The counting and line removal steps are repeated until the group is confined to lines with no intersections, these lines defining triangles. The invention has particular application to the division into triangles of an area served by a wireless LAN, in order to display the variation of a radio signal parameter across the area.

11 Claims, 6 Drawing Sheets

U.S. PATENT DOCUMENTS

| | | | |
|---|---|---|---|
| 5,276,783 A * | 1/1994 | Fossum | 345/423 |
| 5,425,076 A | 6/1995 | Knippelmier | |
| 5,465,390 A | 11/1995 | Cohen | |
| 5,467,341 A | 11/1995 | Matsukane et al. | |
| 5,481,588 A | 1/1996 | Rickli et al. | |
| 5,491,644 A | 2/1996 | Pickering et al. | |
| 5,623,429 A | 4/1997 | Fortune et al. | |
| 5,668,562 A * | 9/1997 | Cutrer et al. | 343/703 |
| 5,870,666 A | 2/1999 | Tanaka et al. | |
| 6,006,089 A | 12/1999 | Sasaki et al. | |
| 6,021,316 A * | 2/2000 | Heiska et al. | 455/67.16 |
| 6,175,950 B1 * | 1/2001 | Scepanovic et al. | 716/13 |
| 6,188,356 B1 * | 2/2001 | Kitayoshi | 342/451 |
| 6,493,679 B1 * | 12/2002 | Rappaport et al. | 705/29 |
| 6,771,966 B1 * | 8/2004 | Chow | 455/446 |
| 6,876,951 B2 * | 4/2005 | Skidmore et al. | 702/186 |
| 2002/0006799 A1 * | 1/2002 | Rappaport et al. | 455/446 |

FOREIGN PATENT DOCUMENTS

| | | |
|---|---|---|
| EP | 0 954 117 A1 | 11/1999 |
| WO | WO 99/26439 | 5/1999 |
| WO | WO 93/15569 | 4/2000 |

OTHER PUBLICATIONS

Rajkumar et al., "Predicting RF coverage in large environments using ray-beam tracing and partitioning tree represented geometry", Jun. 1996, Wireless Networks, vol. 2 issue 2, pp. 143-154.*

Epstein et al., "Generating Triangulations at Random", ACM Transactions on Modeling and Computer Simulation (TOMACS) archive, vol. 4, Issue 3, (Jul. 1994), pp. 267-278.*

Roger R. Skidmore and Theodore S. Rappaport, "SMT Plus(TM) 1.0 User's Manual", Aug. 1996, Virginia Tech, pp. 23-24.*

Rohde and Schwartz, "Portable Coverage Measurement System TS9951- for GSM900/IS00/1900, ETACS/DECT/DAB/CDMA signaling parameters", <URL:http://rohde-schwarz.com/homepage,pp. 1-6, Oct. 1998.*

* cited by examiner

ND TRIANGLES
METHOD OF MAPPING INTO TRIANGLES AN AREA OF WIRELESS LAN AND PORTABLE DEVICE THEREOF

BACKGROUND OF THE INVENTION

Field of the Invention

This invention relates to area mapping and in particular to a method of mapping into triangles an area from a set of sample points spaced over the area.

SUMMARY OF THE INVENTION

The invention arose from the need to represent, as a group of tessellating triangles, an area of a building served by a wireless LAN (local area network). The quality of radio coverage over the area will normally vary, and it is helpful to be able to display this variation on a map of the area, for example on a computer display unit. Interpolation procedures are easier and faster to implement if the area is divided into triangles.

According to the invention there is provided a method of mapping into triangles an area from a set of sample points spaced over the area, comprising:
(a) connecting each point to every other point such that a group of lines is created,
(b) for each line, counting the number of intersections, if any, of that line with any other line,
(c) removing from the group the line, or one of the lines, with the greatest number of intersections, and
(d) for the remaining lines, repeating steps (b) and (c) until the group is confined to lines with no intersections, the lines defining the triangles.

Preferably, the method is performed by a portable site survey tool provided with software for performing the method. The portable site survey tool may have a display unit capable of displaying the mapped area.

In the preferred method, the sample points are locations in an area served by a wireless LAN, in which case the portable site survey tool is in radio communication with an access point of the LAN.

The variation of a parameter may be mapped over the area of each triangle to provide a variation of the parameter over the area. The parameter is preferably related to quality of radio communication provided by a wireless LAN serving the area.

According to another aspect of the invention there is provided a portable computer serving as a site survey tool and programmed to carry out the inventive method.

BRIEF DESCRIPTION OF THE DRAWINGS

The invention will now be further described, by way of example, with reference to the accompanying drawings, in which.

DETAILED DESCRIPTION OF THE PREFERRED EMBODIMENTS

Figure 1:
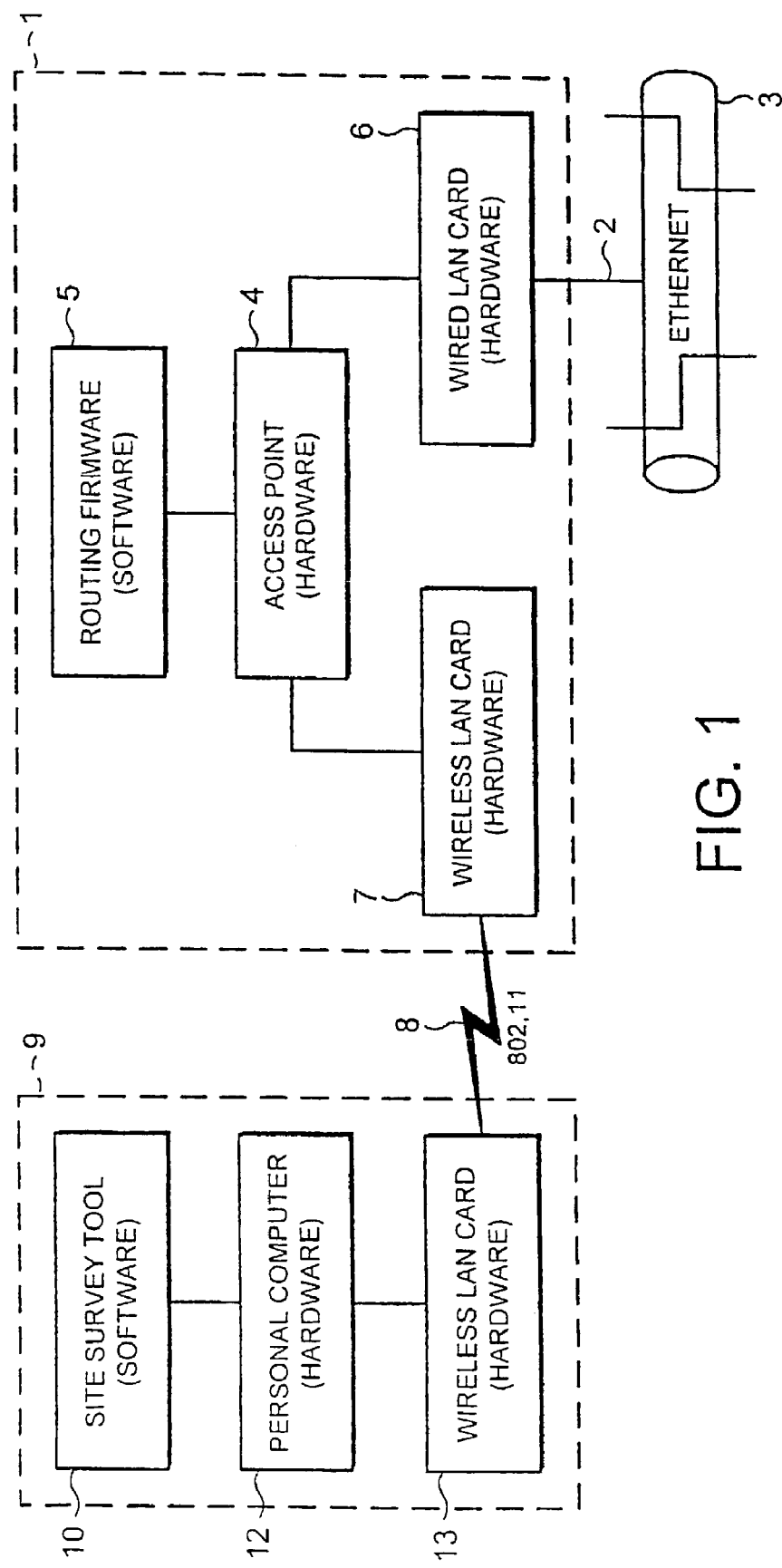
FIG. 1 is a block diagram showing a site survey tool linked by radio to a LAN, for performing a method according to the invention.

When a building is equipped with a wireless LAN, computers within the building communicate by radio with access points of the LAN, the access points being distributed over the area of radio coverage. In FIG. 1, an access point 1 of a LAN is connected by hard wiring 2 to the remainder 3 of the LAN. At the access point 1, there is hardware 4, routing or bridging firmware 5, a wired LAN card 6 (hardware) at the interface with the remainder 3 of the wireless LAN and a LAN card 7 (hardware) at the radio interface 8 with portable computers. In FIG. 1, a sample area of a building covered by the wireless LAN is being surveyed, so the access point 1 is in radio communication with a portable computer in the form of a site survey tool 9 having software 10, a personal computer 12 including a display unit and a wireless LAN card 13 (hardware) at the radio interface 8. It will be appreciated that this radio interface 8 provides two-way transmission of data between the site survey tool 9 and the access point 1 of the LAN.

By the use of the site survey tool 9, the quality of radio coverage over a sample area of the building can be detected and shown as a visual presentation on the display unit of the site survey tool 9, and also on a display unit of any other computer linked to the LAN.

Figure 2:
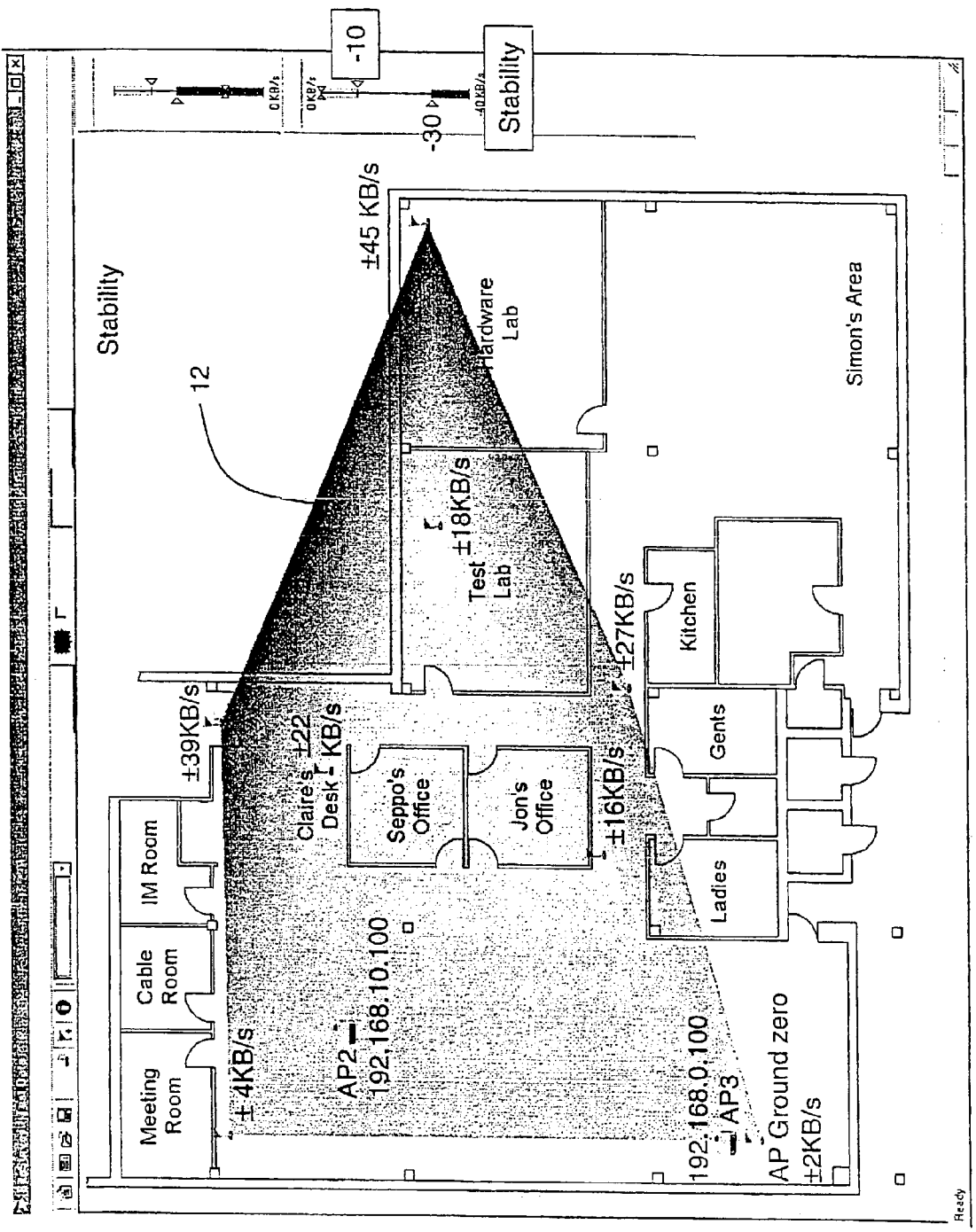
FIGS. 2 to 4 illustrate three possible presentations shown on a display unit of the site survey tool of FIG. 1.
Figure 3:
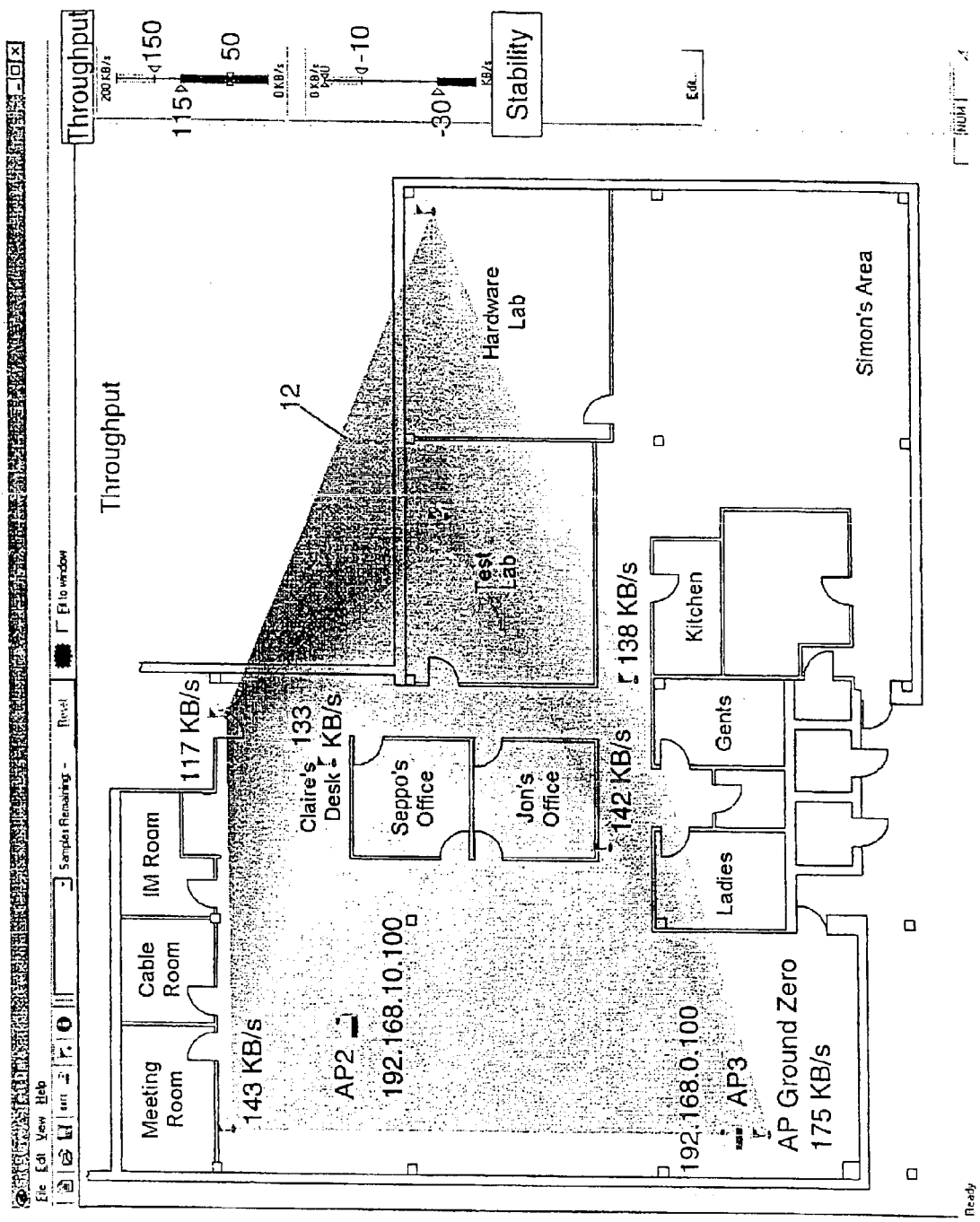
Figure 4:
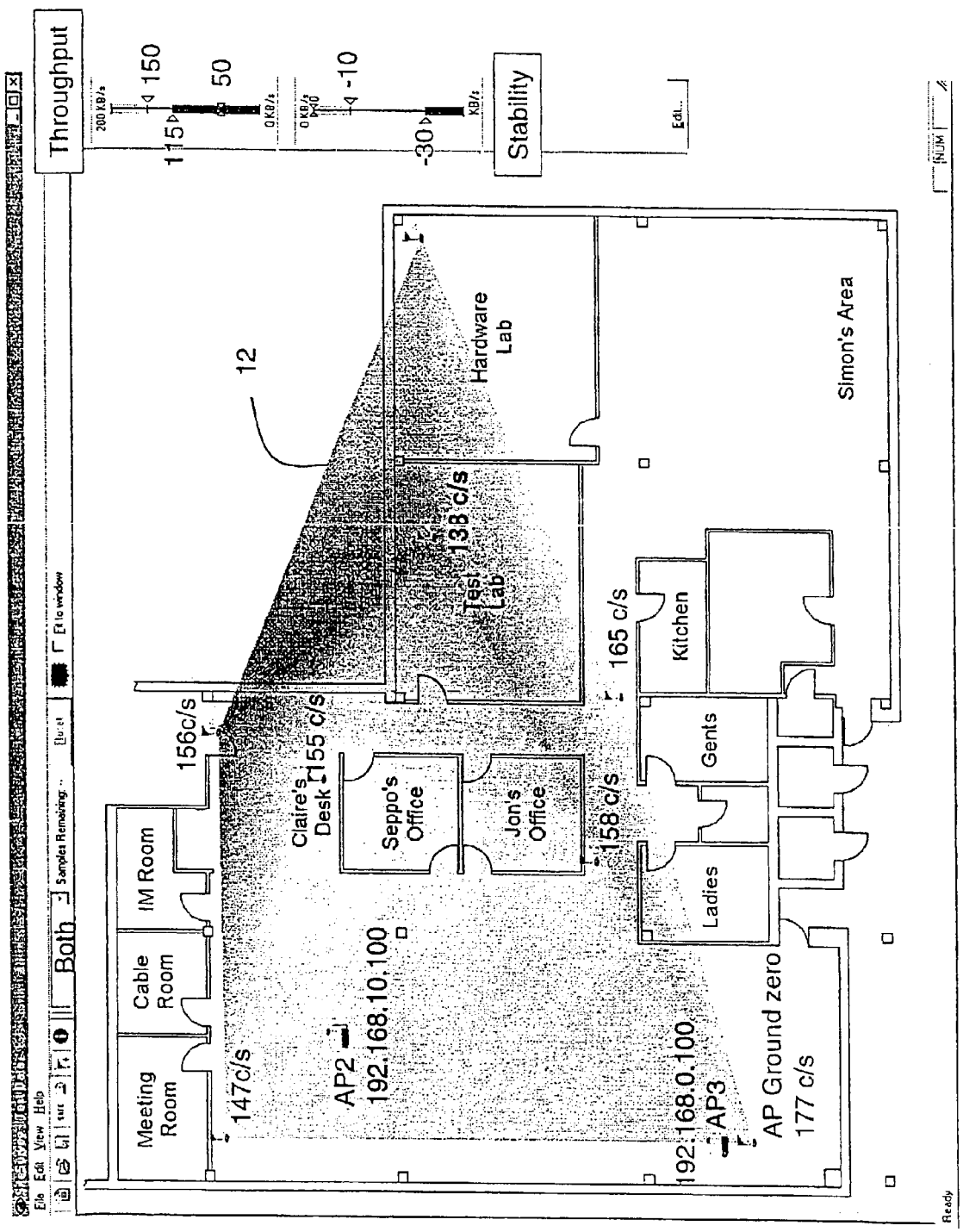

Referring to FIGS. 2, 3 and 4, suppose the area of the building to be surveyed is that within the polygonal shape whose outline is indicated at 12. The outline shape is defined by straight lines drawn between five sample points, and additional sample points are located within the area. The sample points are shown by the flag symbols in FIGS. 2 to 4. A map of the area to be surveyed is entered into the site survey tool software, typically being loaded into the site survey tool 9 from another computer linked to the access point 1. The locations of the sample points are then loaded into the site survey tool software. The site survey tool is then taken to each sample point in turn and a signal parameter is measured at each sample point.

In the described method, two parameters are measured and recorded, namely signal stability and signal throughput. Stability is representative of the variation of signal throughput from an average throughput. Throughput is representative of the rate of received data and is measured in bits per second. Having detected these parameters at the sample points, the software in the site survey tool is able to provide a visual representation (on the display unit of the site survey tool 9) of the variation of each parameter over the sample area. This is done by interpolation, using a gradient fill algorithm. The presentation on the display unit is in color, green being used to show a desirable value of the parameter and red being used to show an undesirable value of the parameter, the display showing variations in intensity of green and red and showing any transition between red and green as a progressive variation in hue.

FIG. 2, which shows the variation of stability over the sample area, shows red areas as dark and green areas as light, the transition being shown as a variation of a grey color.

FIG. 3 shows the same area but with the illustrated parameter being throughput, and FIG. 4 shows a composite presentation where the combination of throughput and stability is represented, with each of these parameters providing a 50% weighting to the combined presentation.

Figure 5:
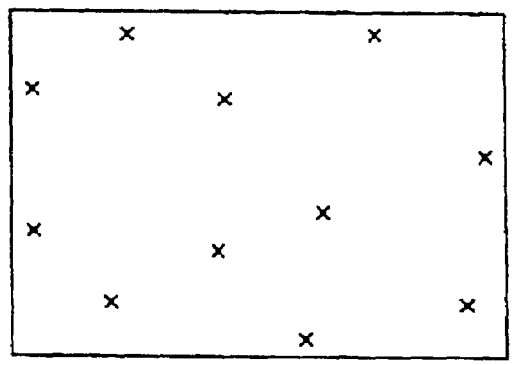
FIG. 5 shows a number of sample points distributed over an area of a building served by a wireless LAN.
Figure 6:
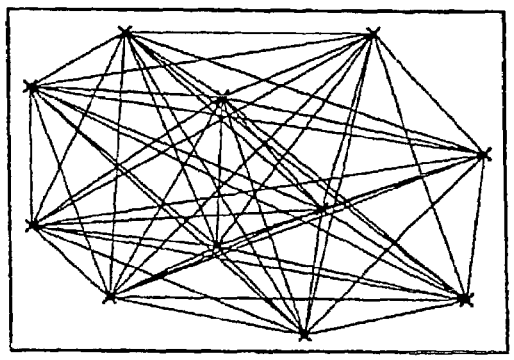
FIG. 6 shows the area after each point has been joined to all other points.
Figure 7:
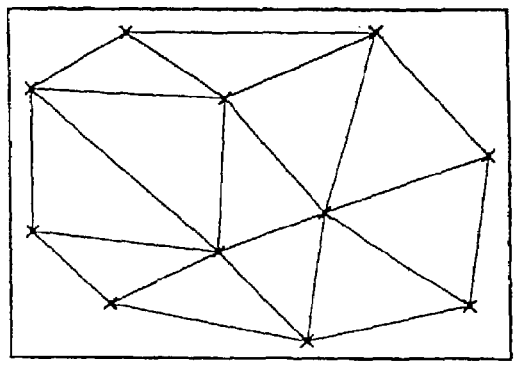
FIG. 7 shows the area represented as a group of tessellating triangles.
Figure 8:
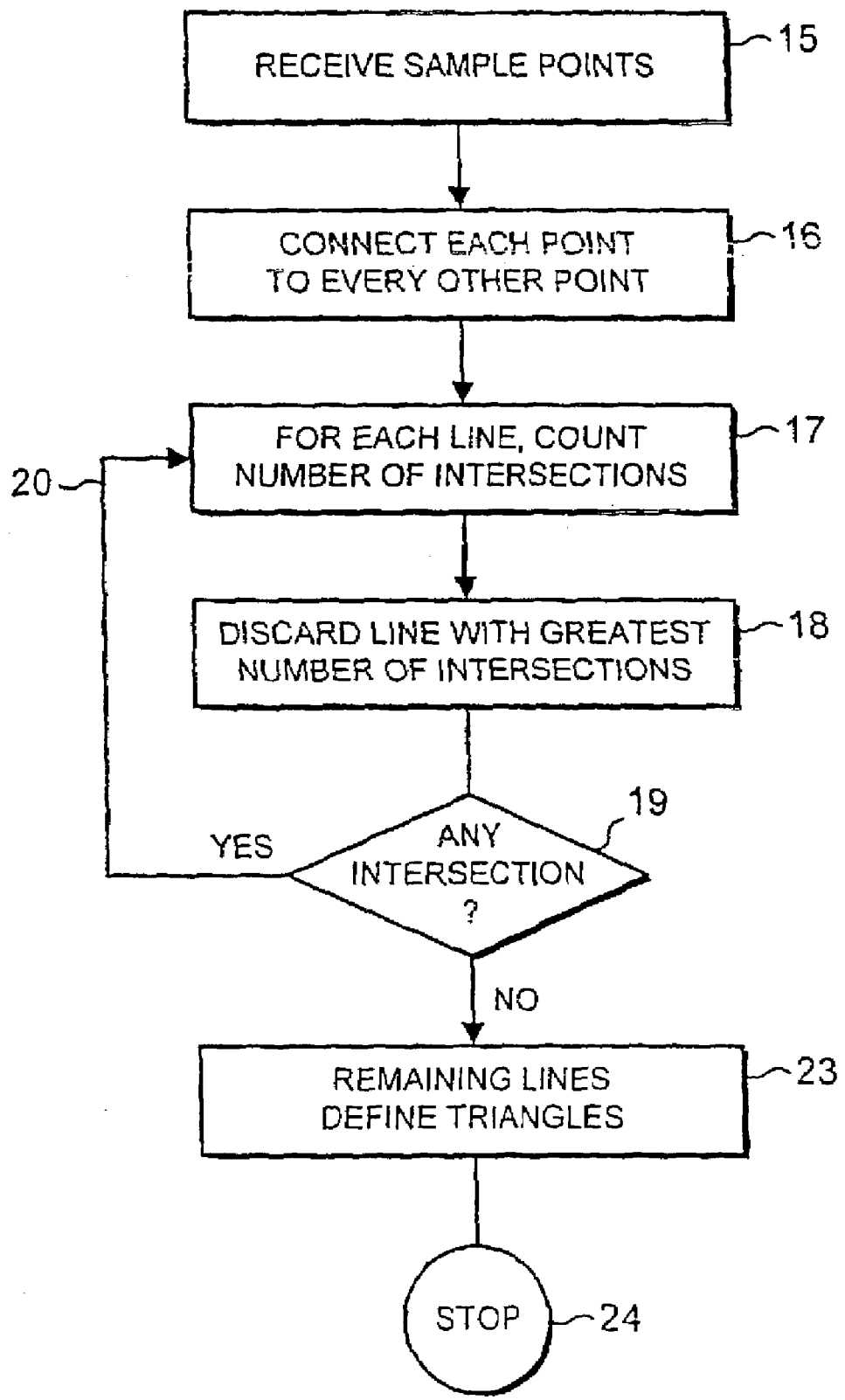
FIG. 8 is a flow diagram illustrating the computational steps of the preferred method according to the invention.

In order to provide the display shown in FIGS. 2 to 4, the sample area is first divided into a group of tessellating triangles, and the invention lies in the way in which the sample area is so divided. Considering the simplified rectangular sample are shown in FIG. 5, a number of sample points, distributed over the area are chosen and the locations of these sample points are fed into the site survey tool 9, as indicated at 15 in FIG. 8. The site survey tool software is then operative to connect every sample point with every other sample point to create, in a list, a group of m lines. This is indicated pictorially in FIG. 6 and by the step indicated at 16 in FIG. 8. Of the m lines, some will have no intersections, some may have only one intersection and some may have multiple intersections with other lines. For each line of the group of m lines, the number of intersections are counted (step 17 in FIG. 9) and the line with the largest number of intersections is discarded from the group, as indicated at 18 in FIG. 8. If more than one line has the greatest number of intersections, one of the lines with this greatest number of intersections is discarded. After step 18, a decision (step 19) is taken as to whether any intersection remains. If there is a remaining intersection (branch 20 in FIG. 8) steps 17 and 18 are repeated until the result of decision 19 is that no intersection remains. Each individual triangle is then identified by finding, for each line, two further lines connecting the ends of the line to a common third point so that the remaining lines define the tessellating triangle, as indicated pictorially in FIG. 7 and by bock 23 in FIG. 8. Having divided the sample area up into the pattern of tessellating triangles as shown in FIG. 7, the sequence of logic steps terminates, as indicated at 24 in FIG. 8.

Having divided the sample area up into tessellating triangles, the variation of throughput or stability is mapped over the area of each triangle by a gradient fill routine (which may be linear, logarithmic or any chosen variation), to provide the visual variation of the parameter over the complete area, in the way previously described with reference to FIGS. 2 to 4.

The invention claimed is:

1. A method, comprising:
    connecting each point of a set of sample points spaced over an area to every other point of the set such that a group of lines is created, wherein the set of sample points are locations in a wireless local area network;
    for each line, counting a number of intersections, if any, of each line with any other line;
    removing from the group one of the lines with the greatest number of intersections;
    for remaining lines, repeating the counting and the removing until the group is confined to lines with no intersections that define the triangles;
    mapping variation of a parameter by interpolating over an area of each triangle to provide a variation of the parameter over the area, wherein the parameter is representative of quality of radio communications over an area served by the wireless local area network; and
    displaying the variation of the parameter over the area to a user.

2. The method according to claim 1, further comprising:
    using a portable site survey tool provided with software to perform the method.

3. The method according to claim 2, wherein the displaying comprises displaying the mapped are on a display of the portable site survey tool.

4. The method according to claim 2, further comprising:
    maintaining the portable site survey tool in radio communication with an access point of the wireless local area network.

5. The method according to claim 3, further comprising:
    maintaining the portable site survey tool in radio communication with an access point of the wireless local area network.

6. The method according to claim 1, further comprising:
    identifying each triangle by finding, for each line, two further lines connecting ends of each line to a common third point.

7. The method according to claim 3, wherein the displaying comprises displaying the variation of the parameter on the display.

8. The method according to claim 4, wherein the displaying comprises displaying the variation of the parameter on a display of the portable site survey tool.

9. The method according to claim 6, wherein the displaying comprises displaying the variation of the parameter on a display.

10. The method according to claim 7, further comprising:
    configuring the display to be a color display.

11. A site survey tool including a portable computer and programmed to carry out the method of claim 1.

* * * * *